(12) United States Patent
Hellsund et al.

(10) Patent No.: US 7,303,266 B2
(45) Date of Patent: Dec. 4, 2007

(54) IMAGER WITH FLEXIBILITY IN CONFIGURATION AND ORIENTATION

(75) Inventors: Per J. Hellsund, Old Saybrook, CT (US); David N. Hicks, Mystic, CT (US); Richard Hudson Bayliss, Jr., Essex, CT (US); Andrew Fulchiero, Niatic, CT (US)

(73) Assignee: Inc.jet, Incorporated, Norwich, CT (US)

( * ) Notice: Subject to any disclaimer, the term of this patent is extended or adjusted under 35 U.S.C. 154(b) by 320 days.

(21) Appl. No.: 10/956,429

(22) Filed: Oct. 1, 2004

(65) Prior Publication Data

US 2005/0078323 A1    Apr. 14, 2005

Related U.S. Application Data

(60) Provisional application No. 60/508,105, filed on Oct. 2, 2003.

(51) Int. Cl.
*B41J 2/17*    (2006.01)
*B41J 2/175*   (2006.01)

(52) U.S. Cl. .......................................... 347/84; 347/85

(58) Field of Classification Search .................. 347/84, 347/13–16, 85
See application file for complete search history.

(56) References Cited

U.S. PATENT DOCUMENTS

| | | | |
|---|---|---|---|
| 5,742,306 A * | 4/1998 | Gompertz et al. | 347/43 |
| 5,907,334 A * | 5/1999 | Hirano et al. | 347/23 |
| 6,371,672 B1 * | 4/2002 | Pirie et al. | 400/692 |
| 2002/0001013 A1 * | 1/2002 | Richtsmeier et al. | 347/43 |
| 2002/0113830 A1 * | 8/2002 | Mantell | 347/6 |
| 2003/0035035 A1 * | 2/2003 | Komplin et al. | 347/86 |

* cited by examiner

*Primary Examiner*—Stephen Meier
*Assistant Examiner*—Sarah Al-Hashimi
(74) *Attorney, Agent, or Firm*—David I. Roche; Daniel A. Tallitsch; Baker & McKenzie LLP (57) ABSTRACT

An imaging device and associated circuit assembly for depositing ink onto moving media. The imaging device is flexible in that it allows the configuration of pens in a variety of ways to enable a user to increase the speed with which printing can be accomplished, vary the colors used in printing, change the orientation of the printing on the media, and/or print at multiple locations at the same time.

14 Claims, 10 Drawing Sheets

SINGLE PEN CONFIGURATION

IMAGER WITH FLEXIBILITY IN CONFIGURATION AND ORIENTATION

BACKGROUND AND SUMMARY OF THE INVENTIONS

This application claims priority to provisional application Ser. No. 60/508,105, which was filed on Oct. 2, 2003.

This application relates to inventions that use fixed inkjet printing pens to apply various inks to substrates of various types. The inventions described herein are owned by the same assignee that owns the inventions shown and described in U.S. Pat. No. 6,837,636 issued Jan. 4, 2005 and U.S. Pat. No. 6,371,672 issued Apr. 16, 2002, both of which are incorporated herein by reference.

Printing stations are known in the art, and it is well known to use fixed inkjet printing pens to apply various inks to a substrate (typically on moving media). Printing applications in which the inventions disclosed herein may be used include printing envelopes, continuous paper stock (for making tickets, and forms etc.) and packaging, including cardboard boxes of various shapes and sizes.

The imager disclosed herein has several advantages over printing systems in the prior art. The imager disclosed herein is very compact and flexible in that it can be used in a wide variety of configurations and orientations, including printing vertically downwardly or horizontally onto the side of a carton, for example.

BRIEF DESCRIPTION OF THE DRAWINGS

These and other features, aspects, objects, and advantages of the inventions described and claimed herein will become better understood upon consideration of the following detailed description, appended claims, and accompanying drawings where:

It should be understood that the drawings are not necessarily to scale and that the embodiments are sometimes illustrated by graphic symbols, phantom lines, diagrammatic representations and fragmentary views. In certain instances, details which are not necessary for an understanding of the inventions described and claimed herein or which render other details difficult to perceive may have been omitted. It should be understood, of course, that the inventions described herein are not necessarily limited to the particular embodiments illustrated herein.

DETAILED DESCRIPTION OF THE DRAWINGS

Figure 1:
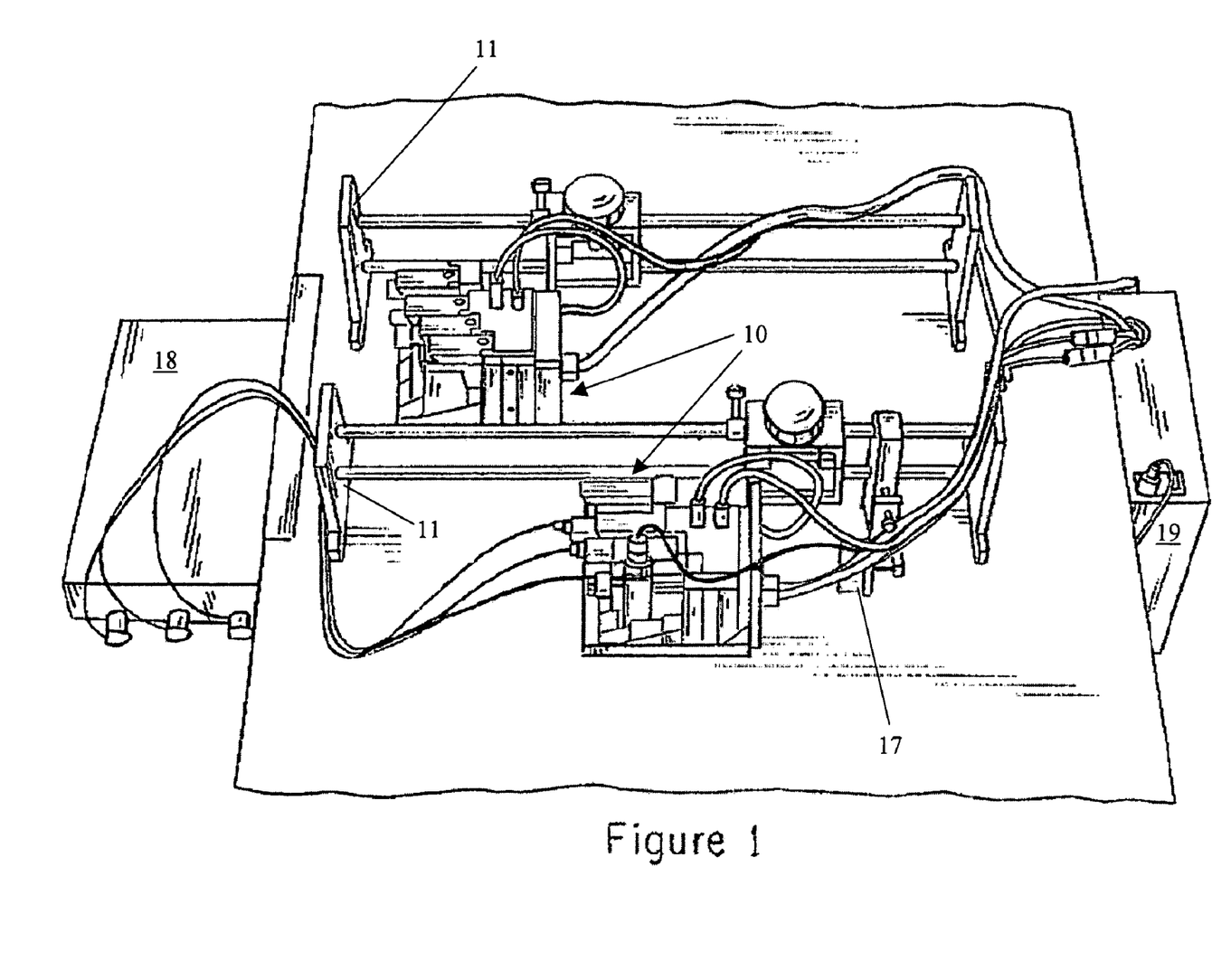
FIG. 1 is a perspective view of an arrangement in which fixed imagers are used to print onto a moving substrate.

FIG. 1 shows an example of a system using two imagers 10, each held by supports 11. A signal from the encoder 17 provides information about the speed of movement of the media or conveyor carrying the items upon which printing is to be placed (not shown) so that the printing by the imagers 10 are positioned correctly along the length of the media. Connections for power and communication (discussed in more detail below) extend between the imagers 10 and an enclosure 19. An ink reservoir 18 supplies ink to one of the imagers, whereas the ink cartridges in the other imager are intended to be replaced when the supply therein is depleted.

Figure 2:
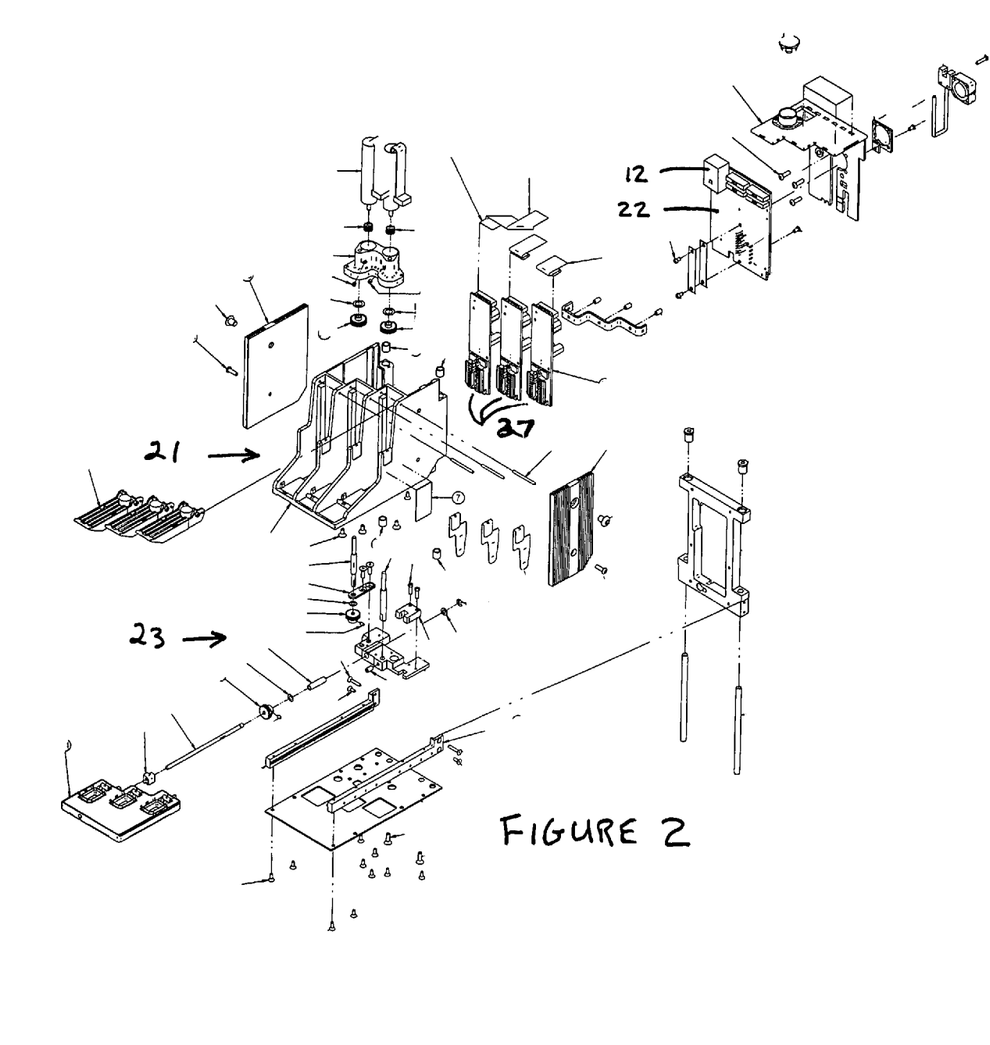
FIG. 2 is an exploded view of an imager made in accordance with the inventions described herein.

FIG. 2 is an exploded view of a three-pen imager 10. The imager 10 has a pen holding assembly 21 that houses pen driver boards 27 designed to be connected by ribbon cables to the main circuit assembly 22. An Ethernet connector 12 extends through an opening in top of the imager 10, and is positioned adjacent to an additional pen socket 29a. A cleaning assembly 23 lies beneath the pen holding assembly 21. For a more detailed discussion of the structure and operation of the cleaning station, reference should be made to Published U.S. patent application US2002/06167563 A1.

Figure 3:
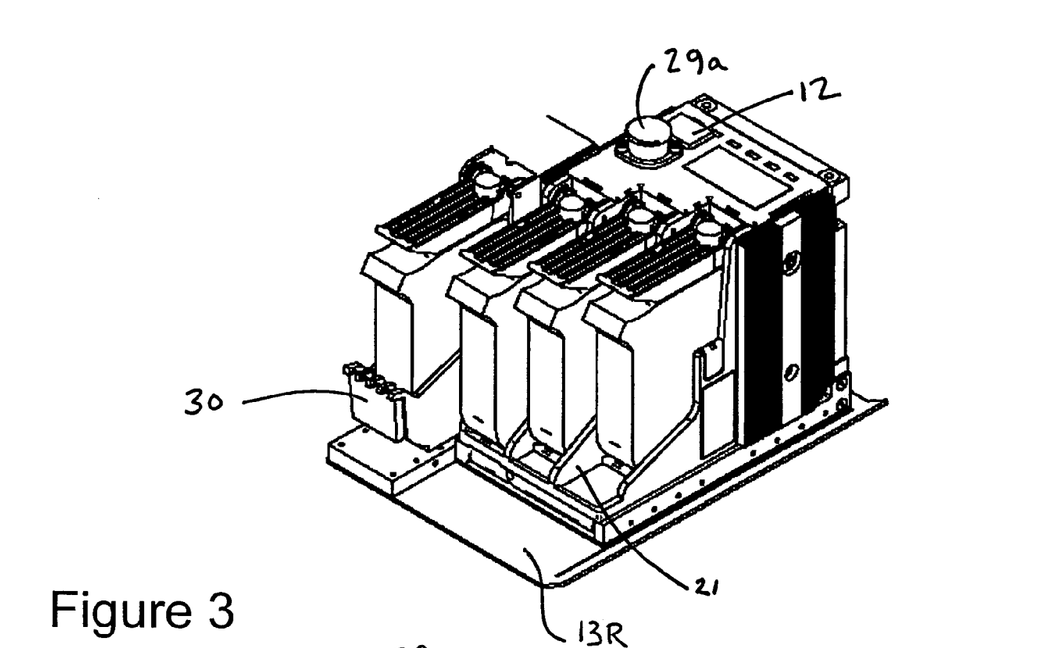
FIGS. 3 and 4 are enlarged perspective views of an imager made in accordance with the inventions described herein mounted for printing on media moving from right to left, and from left to right, respectively.
Figure 4:
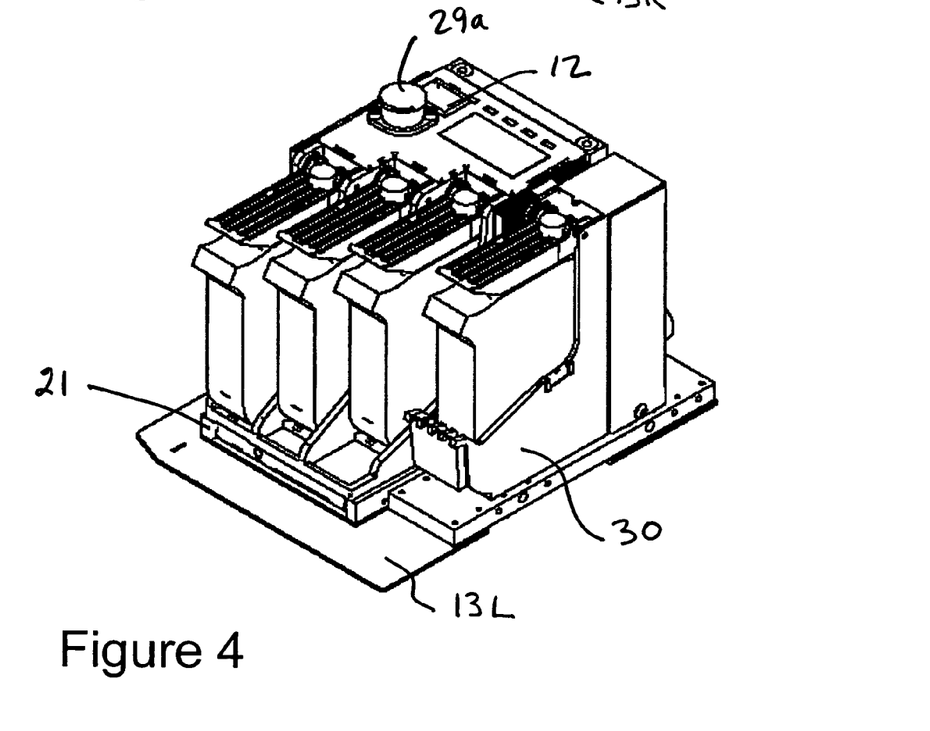

FIGS. 3 and 4 show the imager 10 with an additional pen assembly 30. In FIG. 3 the additional pen assembly 30 is mounted for media moving from right to left, while FIG. 4 shows the additional pen assembly 30 mounted for printing onto media moving from left to right. A left-to-right ski 13L supports the imager 10 and the additional pen assembly 30 in FIG. 4, while a right-to-left ski 13R supports the imager 10 and the additional pen assembly 30 in FIG. 3. FIGS. 3 and 4 show the status LEDs 15a-f (discussed in more detail below). The additional pen assembly is configurable on either side of the imager 10, such that the imager has bi-directional printing capability.

Figure 5:
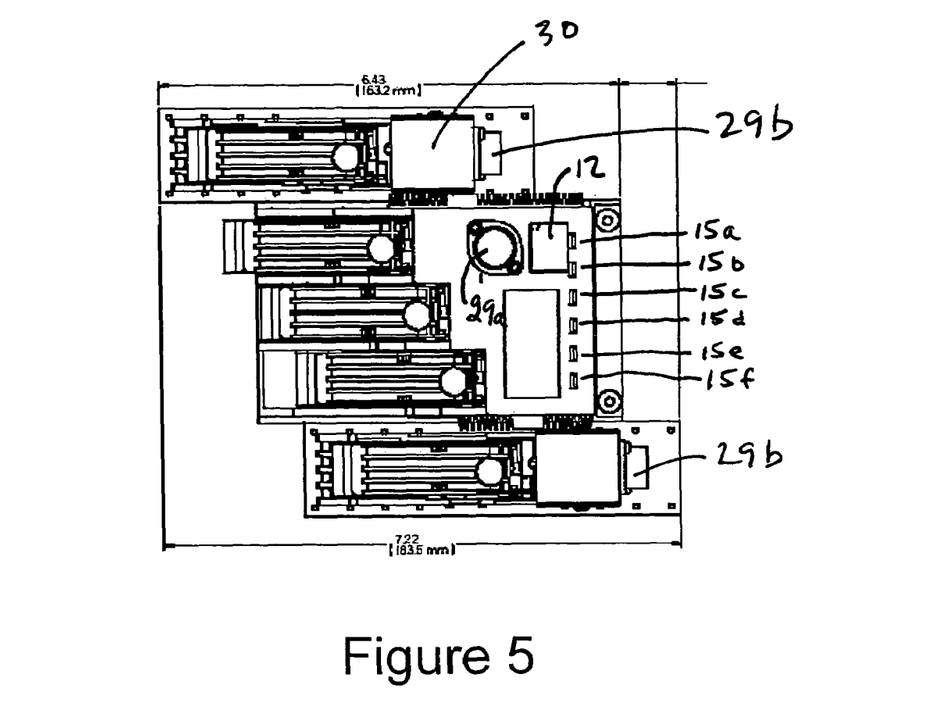
FIG. 5 is a combined top plan view of the imagers depicted in FIGS. 3 and 4.
Figure 6:
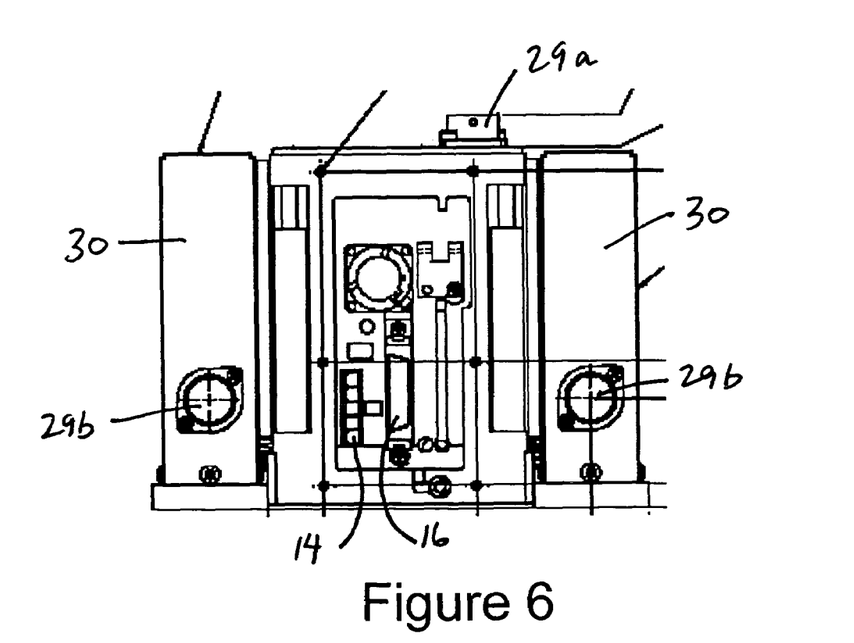
FIG. 6 is a combined rear elevational view of the imagers depicted in FIGS. 3 and 4.

FIGS. 5 and 6 are top and rear views, respectively, of the imagers shown in FIGS. 3 and 4. The additional pen assembly 30 in each configuration (i.e., right-to-left and left-to-right) follows or is downstream of the three-pen holder assembly 21. FIGS. 5 and 6 show the additional pen socket 29a on the top of the three-pen assembly, the corresponding socket 29b on the rear side of each additional pen assembly 30, and the Ethernet connection 12. FIG. 6 shows the power connector 14 and the 36-pin data connector 16 on the rear side of the imager 10.

Figures 7, 8:
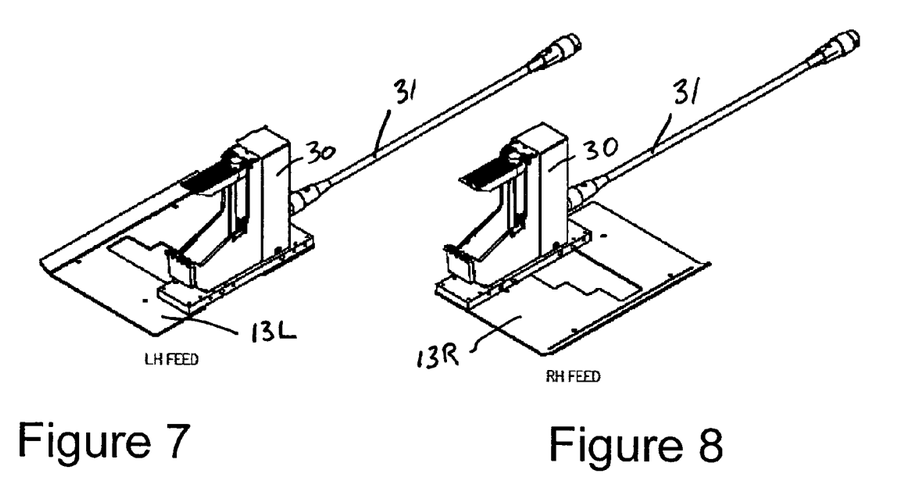
FIG. 7 is a perspective view of the additional pen which is part of the imager shown in FIG. 4.
FIG. 8 is a perspective view of the additional pen which is part of the imager shown in FIG. 3.

As shown in FIGS. 7 and 8, the sockets 29a and 29b are connected by cable 31, which allows print signals and power to be brought from the circuit assembly 22 inside the three-pen assembly to a corresponding additional pen assembly 30.

FIG. 7 shows an additional pen assembly 30 in a left-to-right configuration mounted to the ski 13L with the main three-pen assembly 21 removed for clarity; while FIG. 8 shows an additional pen assembly 30 in a left-to-right configuration mounted to the ski 13R with the main three-pen assembly 21 removed for clarity.

FIGS. 1-8 depict an imager 10, including a three-pen main pen assembly 21 and an additional pen assembly 30, controlled by a circuit assembly 22 (discussed in more detail below). Each pen is typically capable of depositing ink in a width of ½ inch with resolution of 600 DPI. Thus, the combination of the three-pen assembly 21 and an additional pen assembly 30 means that two inches of print capability exists with the imager shown herein. An operator uses a graphic user interface (GUI) to design print layouts on a pen-by pen basis, including stitching across pens. The imager 10 is preferably rigidly mounted so that the skis are parallel to the item or media to be printed.

Another embodiment of the inventions described herein is shown in FIGS. 9-13. In the embodiment of FIGS. 9-13, utilizes individual pen assemblies 130 capable of being positioned independent of one another, providing a user with substantial flexibility in accomplishing a number of possible objectives. FIGS. 15-18 show some of the many possible arrangements of the individual pen assemblies 130.

Figure 9:
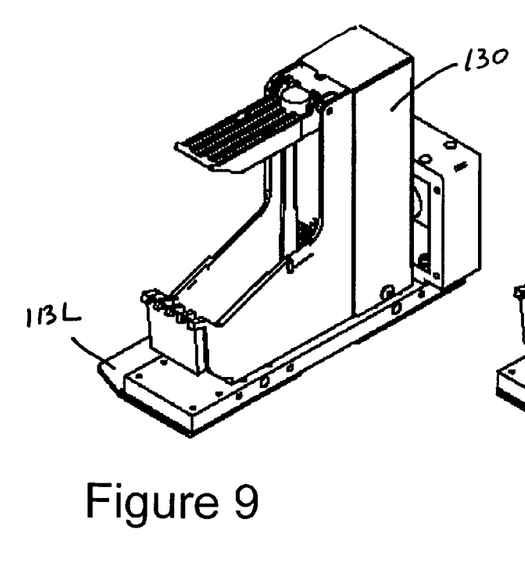
FIGS. 9 and 10 are perspective views of an individual pen mounted for use in printing on to a medium moving from left to right, and from right to left, respectively.
Figure 10:
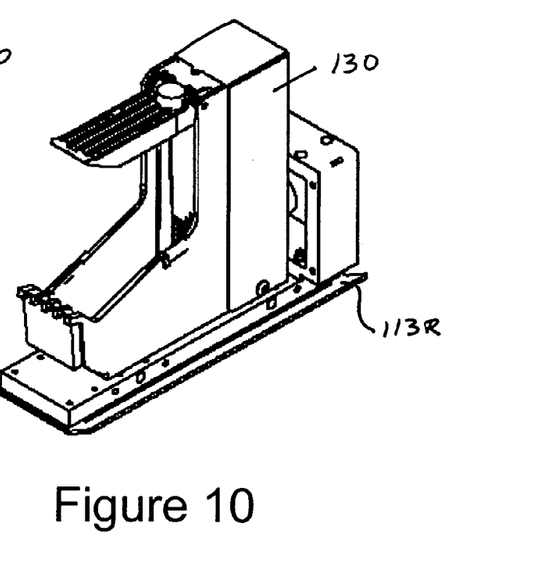

FIGS. 9 shows a single pen assembly 130 mounted to a left-to-right ski 113L having a width to accommodate a single pen assembly, and FIG. 10 shows a single pen assembly mounted to a right-to-left ski 113R also shaped to accommodate a single pen assembly.

Figure 11:
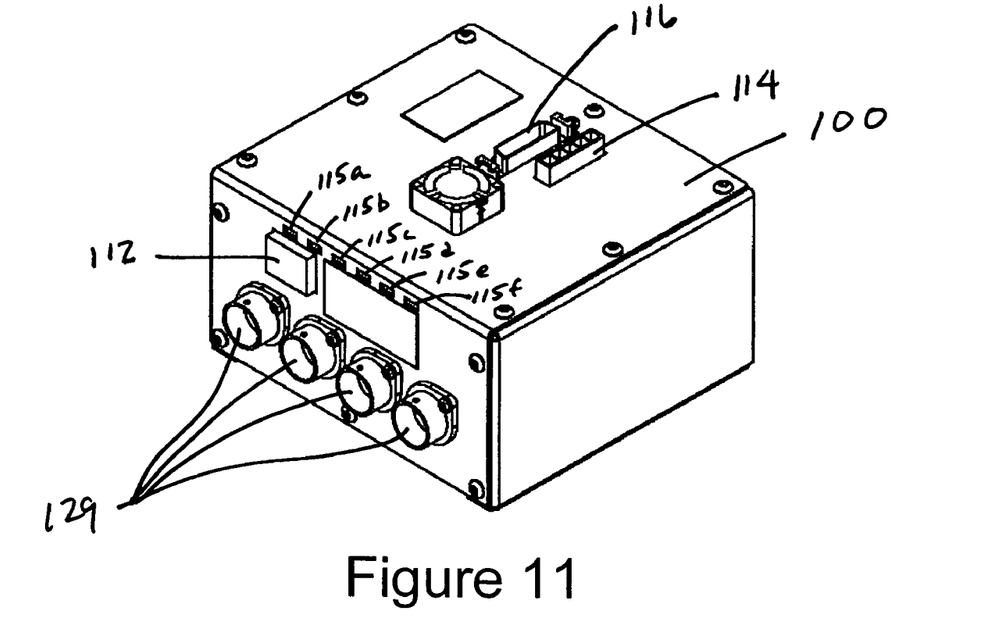
FIG. 11 is a perspective view of a junction box for use with up to four individual pens of the type shown in FIGS. 9 and /or 10.
Figure 12:
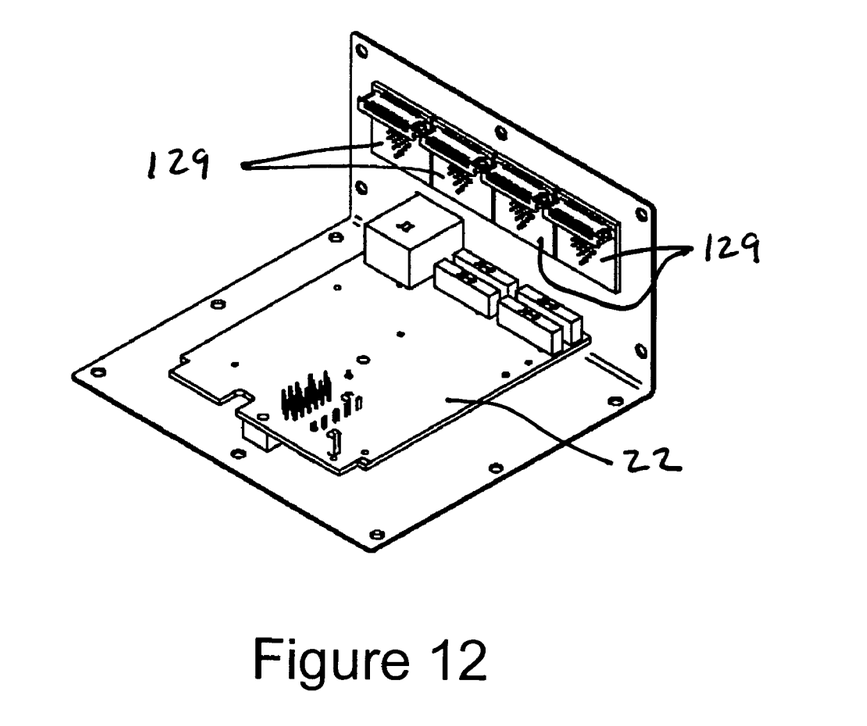
FIG. 12 is a view of the inside of the box shown in FIG. 10.
Figure 13:
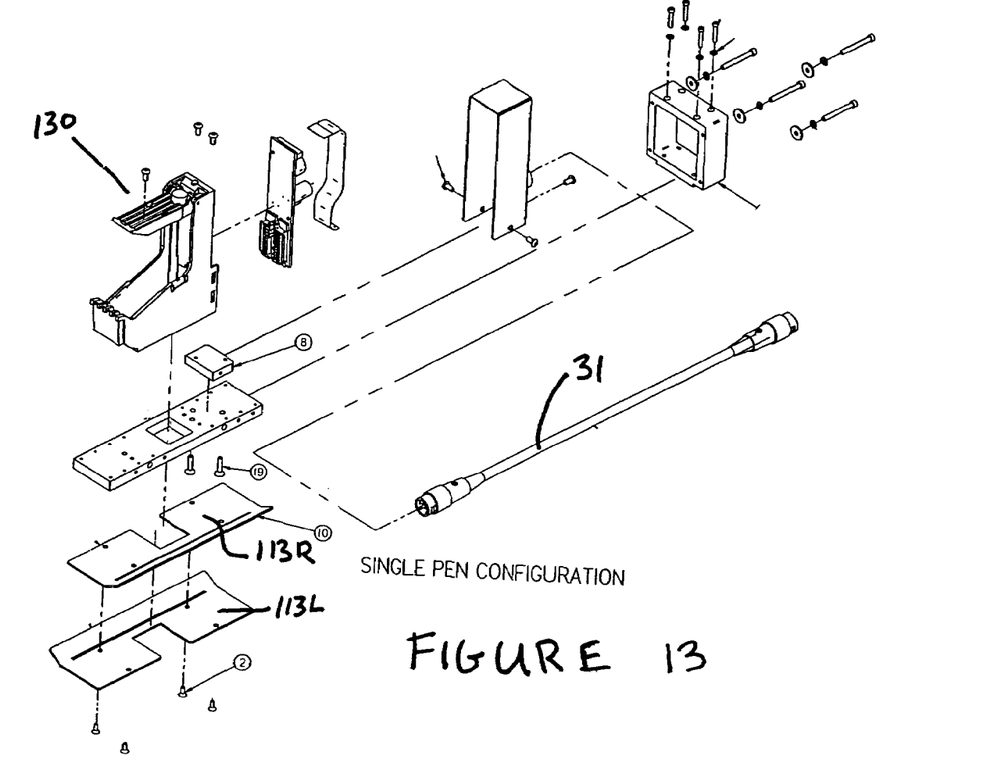
FIG. 13 is an exploded view of the pens shown in FIGS. 9 and 10.
Figure 14:
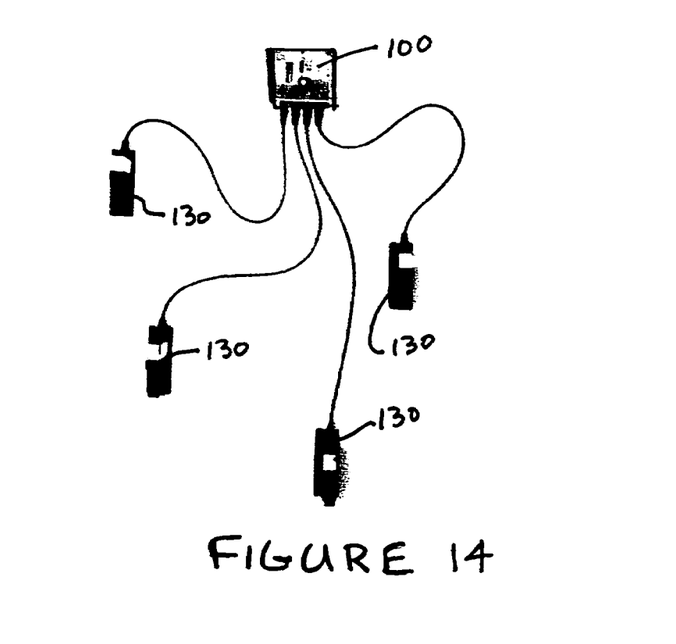
FIG. 14 is a plan view of an assembly employing the four individual pens and a junction box.

FIG. 11 shows a satellite control unit 100 with four sockets 129 which allow print signals and power to be distributed from the control unit 100 to each of one or more single pen assemblies that may be driven by the unit 100. As shown in FIG. 14, up to four single pen assemblies may be powered and controlled by a unit 100. As with the imager 10 discussed above, the satellite control unit 100 has a power connector 114, a 36-pin data connector 116, status LEDs 115a-f, and Ethernet connector 112. FIG. 12 is a view of the satellite unit 100 with its cover removed to show the circuit assembly 22 which is the same as circuit assembly 22 which is inside imager 10, discussed above. The round cables 131 shown in FIG. 14 are used to make the interconnection between the satellite unit 100 and each of the single pen assemblies 130, whereas ribbon cables connect the circuit assembly 22 to the sockets 129 within the satellite unit 100.

Figures 15, 16, 17, 18:
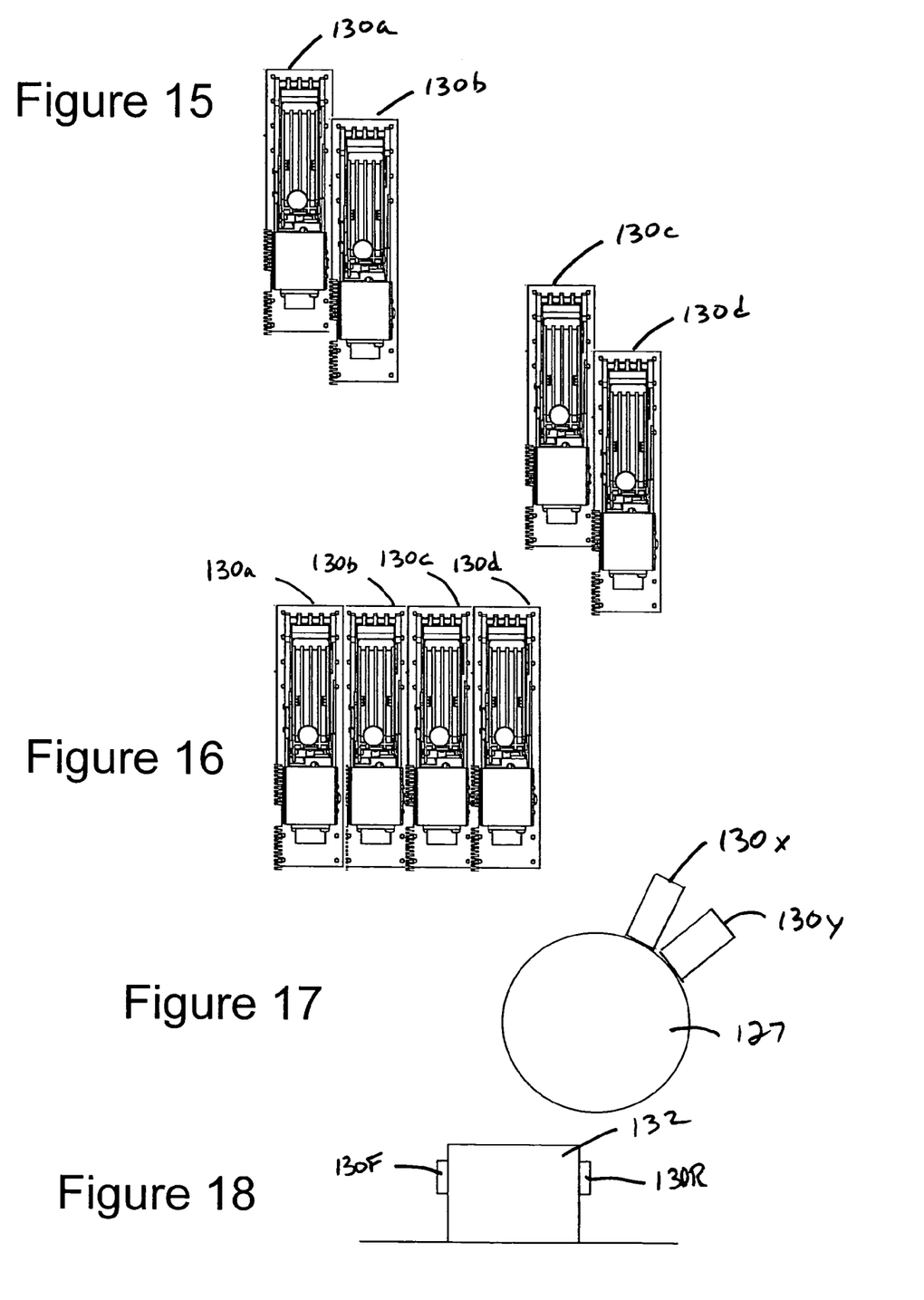
FIGS. 15 through 18 are diagrammatic views of various pen arrangements utilizing the system shown and described herein.

FIGS. 15-18 are intended to demonstrate the versatility and flexibility afforded by the satellite unit 100. In FIG. 15, a single satellite unit 100 can be used to print at two different locations on a particular media or package. Two pen assemblies, 130a and 130b, are mounted in a typical staggered array to accomplish a first 1 inch print zone at a first location, and two other pen assemblies 130c and 130d, are mounted in a typical staggered array to accomplish a second 1 inch print zone at a second location.

In FIG. 16, four single pen assemblies 130a-d are in alignment with each other. This arrangement provides at least two possible printing capabilities, i.e., a first one in which the speed of printing is quadrupled, because the responsibility for printing a ½ inch print area may be shared by all four print assemblies. Thus, for example if the maximum speed for a given pen is 150 feet per minute in order to achieve 300 DPI, the same resolution can be achieved at a 600 foot per minute speed by the configuration of FIG. 16. Similarly, a tripling or doubling of speed could be achieved with a three-pen or two-pen arrangement with the pens aligned as shown in FIG. 15.

Alternatively, a four pen arrangement, as shown in FIG. 16, could be used with colored ink pens, e.g., yellow, cyan, magenta and black or other colors, to obtain process color or multi-colored images, as desired. It should be recognized that achieving process color images would require a high level of control over the movement of the media to obtain proper deposition of the various colors desired.

FIG. 17 shows that the mounting of individual pen assemblies using the satellite unit 100 could be done in a manner whereby an image could be created on a rounded surface, such as a test tube or bottle 127 by mounting the assemblies 130x and 130y such that they are not in the same plane, but are at an angle with respect to each other.

FIG. 18 shows an arrangement whereby pen assemblies are mounted so as to print on opposite sides of a carton 132 at the same time. The arrangement of FIG. 18 could be such that there are two pens on each side of the carton 132. The possible arrangements include staggering the pens to maximize print area, aligning the pens to maximize print production, or using different colored pens to achieve color variations in the image to be printed.

Figure 19:
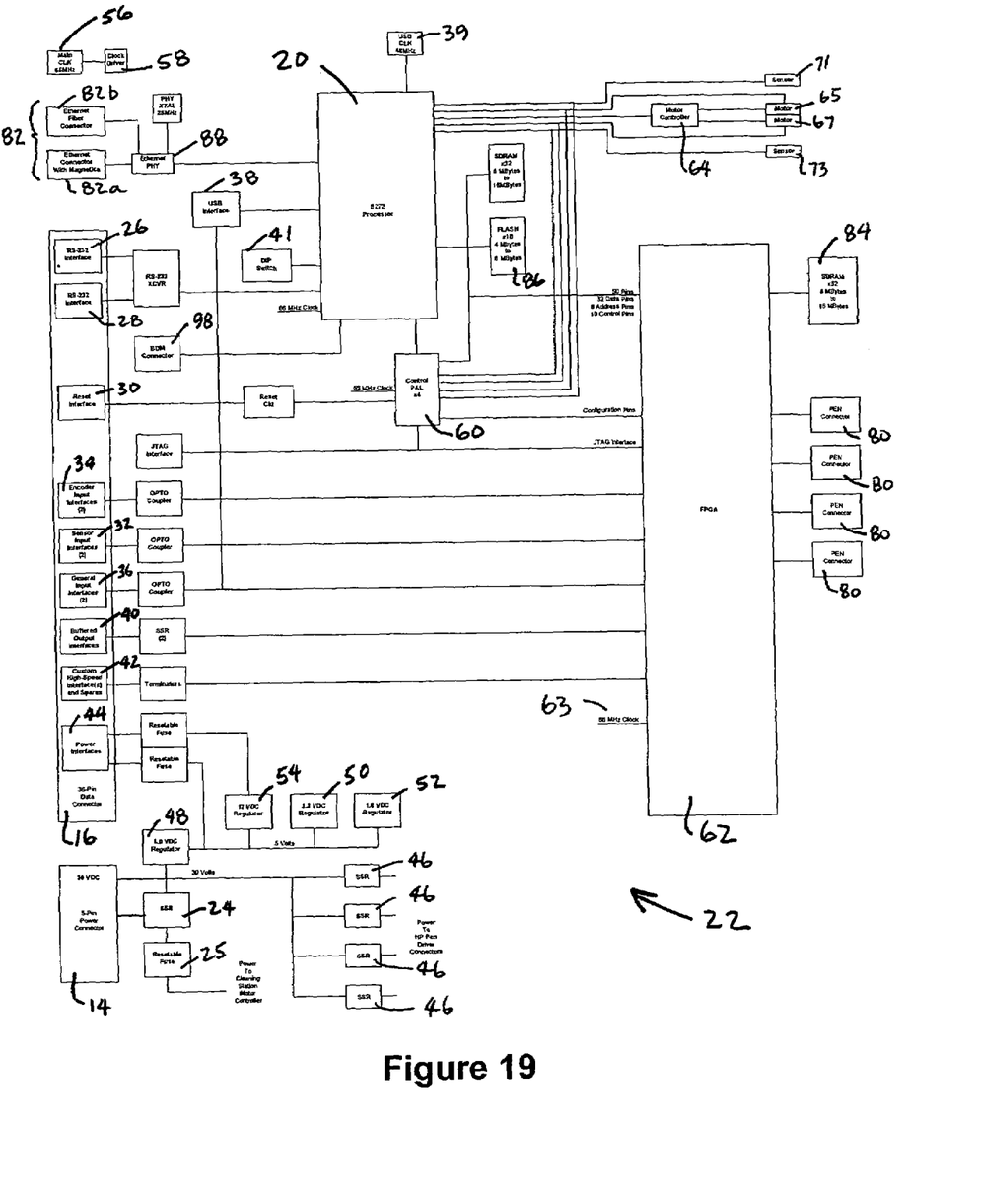
FIG. 19 is a block diagram of a circuit assembly utilized in the system shown and described herein.
Figure 20:
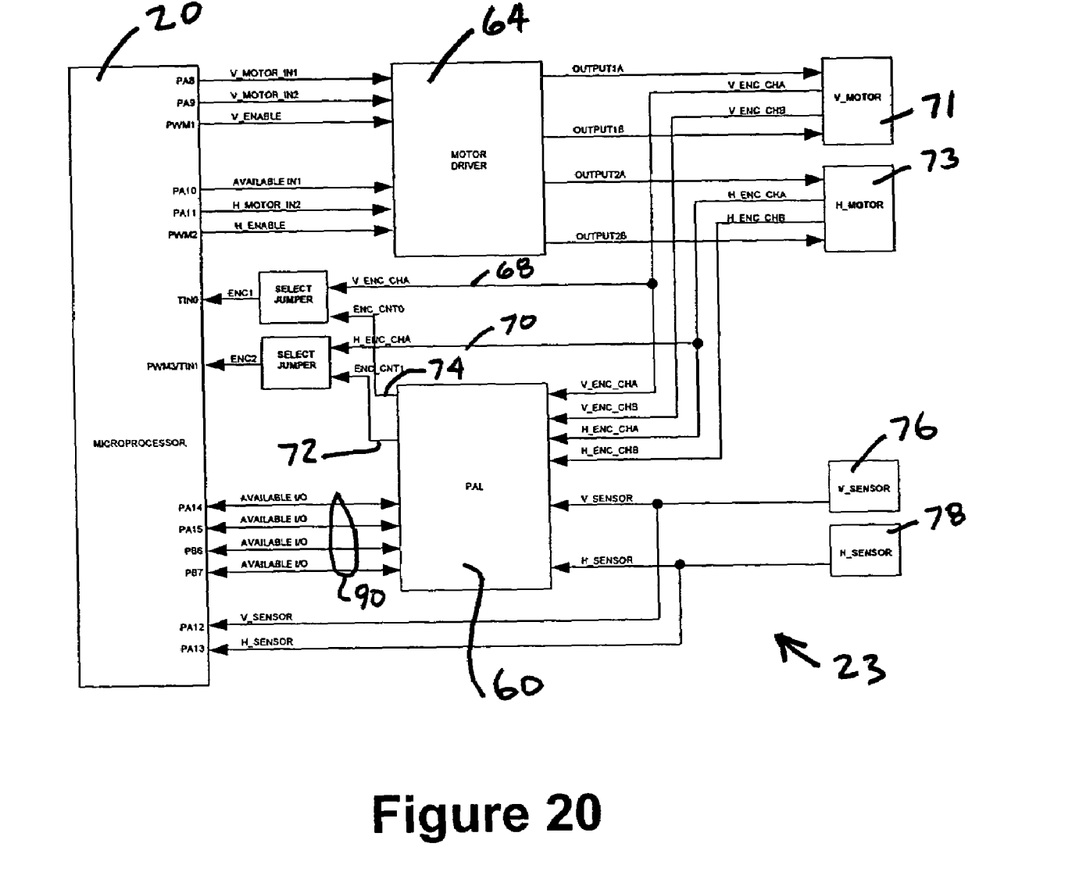
FIG. 20 is a block diagram of a portion of the diagram shown in FIG. 18.

The imager 10 and the satellite unit 100 discussed above each contain the same circuit assembly which is designed to support the following, as depicted in the block diagrams that are FIGS. 19 and 20:

1) Shielded RJ45-style connector supporting 10/100 Base-TX Ethernet over twisted pair cable through connection 12, optionally convertible to a fiber optic connector supporting 10/100 Base-FX Ethernet;
2) 5-pin power connector 14 supporting:
   30 Volt DC Power to the Imager
   Cleaning Station Motor Power/Interlock Circuit;
3) 36-pin General Purpose I/O connector 16 supporting:
   Two RS-232 interfaces;
   Six optically isolated data inputs capable of supporting encoders and optical sensors;
   Two optically isolated data outputs capable of supporting up to 60 volts AC/DC @ 1 Amp;
   Custom high speed differential I/O interface;
   External reset interface;
   USB interface supporting a USB 1.1 peripheral device; and
   External Power (5 Volt DC @ 500 mA and 12 Volt DC @ 500 mA) for external devices.

The imager 10 and satellite unit 100 each incorporate several different standard interfaces, as well as custom interfaces and spare signals, to provide maximum flexibility for various installations and configurations, as well as provide future expansion capability.

The imager 10 and satellite unit 100 each contain three external connectors: an 8-pin (RJ-45) 10/100 Base-TX ethernet connector 12, a 5-pin power connector 14, and a 36-pin (mini centronics) I/O connector 16.

Ethernet Connector

The 8-pin, RJ-45, 10/100 Base-TX ethernet connector 12 supports the four ethernet signals (TX+, TX−, RX+, and RX−) as well as providing terminations for the two unused wire pairs on the RJ-45 ethernet connector 12.

The 10/100 Base-TX Ethernet Connector can optionally be replaced with a 10/100 Base-FX fiber transceiver.

Power Connector

The 5-pin power connector 14 supports DC Power Input, a Motor Power/Interlock Circuit, and a shield connection.

The imager 10 and satellite unit 100 each require +30+/−2 VDC@ ~6 Amps to support the electronics, including up to 4 HP C8855A OEM Print Cartridge Driver Board Assemblies.

A motor interlock relay 24 is provided on the circuit assembly 22 for the cleaning station motors. Grounding pins 3 and 4 of the power connector energizes the motor interlock solid-state relay and enables the motors. Optionally, these pins can be used as an Auxiliary Motor Power Interface to provide power to the cleaning station motors. This optional interface allows OEMs to externally interlock the motor drive voltage.

I/O Connector

The 36-pin I/O connector 16 provides numerous interfaces between the circuit assembly 22 and external systems. The connector 16 is commonly used in parallel printers, so various cables are readily available. The specific interfaces utilized in any specific installation are determined using an external circuit board assembly that attaches to the 36-pin I/0 connector 16, which contains the following interfaces:

- RS232 Interfaces 26 and 28—Six wires are used to provide two independent interfaces to external RS-232 connectors 26 and 28. Three pins, supporting the TxD, RxD, and Gnd signals, are provided for each interface. No hardware handshaking is provided in the RS-232 interface implementation.
- Reset Interface 30—Two wires are used to provide an interface to an external reset switch. One pin provides a reference ground and the other pin provides a reset input. A switch closure of these two contacts will cause a low-level reset of the on-board microprocessor.
- Sensor Interfaces 32—Four wires are used to provide two separate external sensor input interfaces. Each sensor interface uses a wire pair to connect to an input opto-coupler through two 680 ohm current limiting resistors. The circuit is designed to interface with a 12 Volt sensor and to support either NPN or PNP-based sensors, using approximately 8 mA of current.
- Encoder Interface 34—Four wires are used to provide an encoder interface supporting quadrature decoding. Two separate external input interfaces are provided to support both Encoder channels A and B. Each interface uses a wire pair to connect to an input opto-coupler through two 220 ohm current limiting resistors. The circuit is designed to interface with a 5 Volt sensor, using approximately 8 mA of current.
- General Purpose Input Interface 36—Four wires are used to provide two general purpose input interfaces. Each interface uses a wire pair to connect to an input opto-coupler through two 220 ohm current limiting resistors. The circuit is designed to interface with a 5 Volt signal, using approximately 8 mA of current, but can be modified to support a 12 Volt signal by adding a single 1 Kohm resistor to either interface wire. Two wires used in one of the General Purpose Input Interfaces are shared to provide a USB Device. The two pins carry the USB differential Data lines (D+, and D−).
- General Purpose (Buffered) Output Interface 40—Four wires are used to provide two general-purpose output interfaces. Each interface uses a wire pair to connect directly to a solid-state relay capable of switching up to 1 Amp of AC or DC voltage up to 60 volts peak. The maximum on resistance of the solid-state relay is 500 milliohm.
- High Speed LVPECL I/O Interface 42—Eight wires are used to provide an interface supporting four high-speed Imager-to-Imager interconnects. Terminators are provided for each signal pair, with two signal pairs configured as transmitters and two signal pairs configured as receivers. The transmitter pairs can optionally be configured as receivers through a factory modification to the PCB Assembly. The "default" setup is to use two wire pairs for LVPECL transmitters and two wire pairs for LVPECL receivers. LVPECL was selected because the Xilinx VirtexE FPGA utilized supports LVPECL directly using 3.3V I/O power.
- Power Interfaces 44—Four wires are used to provide DC power to external circuitry. The wires provide +12 VDC, +5 VDC, and two (2) GND connections to power external circuitry, sensors, and encoders. Each of the DC power supplies is attached to the connector through a solid-state fuse to prevent excess current draw from external circuitry.

Power Supply Circuitry

30 Volts of DC power is provided to the circuit assembly 22 through the power connector 14. This power is then distributed to the four pen drivers 19 through solid-state relays 46, the motor controller 64 through a solid-state relay 24, and the onboard voltage regulator circuitry 50. An optional modification allows the motor controller to be powered directly through the motor interlock pins on the power connector 14.

Power Distribution

Pen Interface Power

30 Volts of DC Power from the input connector 14 is provided to the four pen driver interfaces (not shown) through four separate solid state relays 46, allowing individual control of the power to each pen. The solid state relays 46 used are capable of switching up to 2 Amps of current and have a maximum on resistance of 150 milliohms. Each pen driver requires a maximum current of 1.33 Amps.

Motor Interface Power

30 Volts of DC Power for the motor controller 64 is normally provided from the input connector 14 through a solid-state interlock relay 24 and solid-state fuse 25. However, power can optionally be input directly through the interlock pins on the power connector 14. Auxiliary power could be used to drive the motor interface if a different voltage is used to drive the motors, or if an external interlock of the motor drive voltage power supply is required.

Voltage Regulator Circuitry

The imager 10 and satellite unit 100 each have on-board regulators 48, 50, 52 and 54 that generate four different DC voltages from the 30 Volts DC input on the power connector 14. First, the 30 Volt DC input power is converted to 5 Volts DC using a high-efficiency switching regulator 48. The circuit of the 5 Volt DC regulator 48 is capable of generating 4 Amps of current. Only a small amount of 5 Volt DC power is used on the circuit assembly 22 to support the embedded photo sensors used for the automated cleaning station and the motor driver. Linear regulators 50 and 52 are used to generate 3.3 Volts DC and 1.8 Volts DC, respectively, from the 5 Volt DC power. The linear regulators 50 and 52 used are capable of supporting currents up to 3 Amps, providing support for potential peak current requirements. Under normal conditions the 3.3 Volt supply is expected to require about 1.5 Amps and the 1.8 Volt supply is expected to require about 0.8 Amps. A switching regulator 54 is also supplied to generate 12 Volts DC from the 5 Volt DC supply. 12 Volts DC is not required by any of the on-board circuitry, but is provided to power external sensors. The regulator 54 used to generate 12 volts is capable of being converted for operation up to 28 Volts DC and generates up to 0.5 Amps of current.

Clock Generation

Main Oscillator

The circuit assembly 22 uses one main oscillator for all on-board circuitry. This oscillator runs at 66 MHz, the maximum frequency supported by the microprocessor 20.

Clock Driver

The circuit assembly 22 has three different integrated circuits that must be provided synchronous clocks. A clock driver 58 is used in the to assure proper distribution of all clocks. The output of the main oscillator 56 is input to the clock driver 58, which buffers and drives the clock signal to the clock input of each integrated circuit using a source terminated, low cross-talk, clock line. The clock driver 58 provides clocks to the microprocessor 20, the PAL (programmable array logic) device 60, and the FPGA (field programmable gate array) 62. In addition, a second clock 63 is provided to the FPGA 62 for configuring the device. The PAL device 60 controls the clock driver enable for the FPGA 62 configuration clock, allowing the clock to be disabled when not in use.

USB Oscillator

The microprocessor used in the circuit assembly 22 has an integrated USB transceiver (not shown). The processor 20 requires a 48 MHz clock 39 in order to use the integrated USB interface 38, so a separate USB oscillator is provided in the hardware design.

Integrated Cleaning Station

The imager 10 includes an integrated cleaning station of the type more fully described in Published U.S. patent application US2002/06167563. The integrated cleaning station electronics include a motor driver 64, two DC motors 65 and 67 (with integrated encoders), and two photo sensors 71 and 73.

Control Interface

The motor control circuit 23 for controlling the motors that are part of the cleaning station is shown in FIG. 20. There are two different techniques to control the integrated cleaning station.

In the default mode of controlling the integrated cleaning station each motor controller has two inputs that control motor direction. These signals are driven directly from microprocessor general-purpose I/O (GPIO) pins. The polarity of these signals determines motor direction. The enable pin of each motor control circuit is connected to one of the microprocessor's Pulse Width Modulator (PWM) output pins 66. Asserting this enable signal causes the motor driver to "move" the motor in the selected direction. By using the microprocessor's PWM outputs the programmer has the ability to vary the speed of the motor. The "A Channel" from each of the motor encoders is connected to one of the microprocessor's timer inputs. As each motor moves, the encoder generates 16 pulses per revolution to the timer input. Each motor control circuit also contains a photo sensor to detect a "home", or "zero", position for each of the motor circuits. These two photo sensors are connected directly to microprocessor GPIO pins. The photo sensors require 5 Volt DC power, but are pulled up to 3.3 Volts at the input to the microprocessor. The sensors are NPN-type sensors that pull the signal to ground when blocked, or allow the output to float (to 3.3 Volts) when not blocked.

In an alternative mode of controlling the integrated cleaning station, both channels from each of the motor encoders 72 and 74 are connected to the PAL 60 and the PAL 60 performs quadrature decoding of the motor encoder signals. The quadrature decoder then generates "up" and "down" signals to the microprocessor counters. This technique minimizes the number of times the controller has to "home" each motor because encoder jitter is eliminated and the microprocessor can track the exact location of each of the motors (one at a time).

Motor Driver

The integrated cleaning station uses a dual half-bridge motor driver integrated circuit 64 to drive the two motors. Control signals to the motor driver come directly from the microprocessor 20. Power for the motors comes either from the 30 VDC power supply or the auxiliary power supply pins through a 1.1 Amp solid-state fuse. The motor driver 64 is capable of driving more then 5 Amps to the motors, and has a large integrated heat sync.

Motor Interfaces

Each motor connects to the circuit assembly 22 using a 6-pin Connector. This connector provides interfaces to the motor and to the encoder attached to the motor.

Motor Power

Power to drive the motors is provided on two pins of the 6-pin motor connector. The polarity of the voltage on these pins varies, depending on the direction of the motor.

Motor Encoder

5 VDC power and ground for the motor encoder is provided on two pins of the 6-pin motor connector. Two additional pins are used for the motor encoder output channels. In default mode, only channel A is input directly to a counter input on the microprocessor. As discussed earlier, the hardware also supports an optional mode where both encoders are input to the PAL 60 for quadrature decoding.

Motor Sensor Interfaces

Each of the motor sensors 76 and 78 connects to the circuit assembly 22 using a 3-pin connector. This connector contains 5 VDC power, ground, and the input from the sensor.

Reset Control

The circuit assembly 22 utilizes an integrated circuit to provided reset on power up. The reset input to this integrated circuit is provided on the 36-pin external I/O connector 16 at the power interface 44 to allow users to generate a hardware reset of the electronics.

Microprocessor Subsystem

The imager 10 and satellite unit 100 each is controlled by a compact, but powerful microprocessor subsystem. The circuitry and interconnect of the microprocessor signals is minimized to keep the microprocessor circuitry at a minimum, eliminating buffers and drivers. Image processing is performed by the microprocessor and then data is transferred to the embedded FPGA 62 for output to the pen driver boards 80.

Microprocessor

The circuit assembly 22 uses the Motorola MCF5272 ColdFire Integrated Microprocessor 20. The processor 20 contains a variety of communications and general-purpose peripherals, including Ethernet, USB, and RS232. Utilizing a V2 ColdFire core, the microprocessor was designed to maximize code density and performance while minimizing die area.

SDRAM

The microprocessor subsystem includes either 8 or 16 Mbytes of SDRAM memory 84. The SDRAM memory is implemented with a single, 32-bit wide TSSOP memory chip.

FLASH Memory

The microprocessor subsystem includes either 4 or 8 Mbytes of FLASH memory 86. The FLASH memory is implemented with a single, 16-bit wide BGA memory chip.

FPGA Interface

The microprocessor subsystem connection to the FPGA is implemented as a fully decoded 8 Mbyte memory space. The interface between the microprocessor and the FPGA is 32-bits wide. Three microprocessor Chip Selects are connected directly to the FPGA, allowing up to 24 Mbytes of address decoding. In addition, the FPGA has the ability to drive two interrupt requests to the Microprocessor.

PAL Interface

The microprocessor subsystem connection to the PAL 60 is minimal. No microprocessor address lines are provided to the PAL. Instead, the PAL 60 decodes the processor bus control signals and has three chip selects and four general-purpose I/O connections to the microprocessor. The PAL is connected to the microprocessor to perform FPGA programming during system initialization.

Ethernet PHY

The microprocessor subsystem includes an AMD 79C874 Ethernet PHY 88. The PHY 88 is capable of supporting either TX (magnetic) interface 82a or FX (fiber-optic) interface 82b at 10 or 100 Mbits per second. The circuit assembly 20 is able to utilize either interface.

Transformer-based Interface

An ethernet connector with integrated magnetics 82a is preferred. Utilization of integrated magnetics reduces the footprint of the interface, as well as reducing the magnetic emissions of the circuitry. A option is to replace the transformer-base Ethernet interface with a fiber transceiver 82b.

USB Interface

The MCF 5272 Coldfire microprocessor 20 includes a USB device transceiver.

RS232 Interfaces

The MCF5272 Coldfire microprocessor 20 includes two RS232 interfaces.

DIP Switch

A system configuration DIP switch 41 is included in the circuit assembly 22. The DIP switch 41 connects directly to four general purpose I/Os on the microprocessor 20, so their use is not pre-determined. The DIP switch is used to set the least significant bits of the imager's (or satellite unit's) ethernet address.

FPGA Functions

The circuit assembly 22 includes a Xilinx Virtex-E Field Programmable Gate Array (FPGA) 62. This FPGA 62 receives commands and image data from the microprocessor 20, buffers, formats, and outputs this data to the four integrated pen drivers. In addition, the FPGA provides a pen configuration interface, external I/O interfaces for sensors, encoders, and relays, as well as providing a high-speed custom interface for expansion.

Microprocessor Interface

The FPGA 62 has a 32-bit wide interface to the microprocessor 20. The entire 32-bit microprocessor address space, utilized by every microprocessor Chip Select, is decoded by the FPGA 62.

SDRAM Interface

The FPGA 62 includes an embedded SDRAM 84. The SDRAM memory interface is implemented with a single, 32-bit wide TSSOP memory chip. Depending on the implementation this SDRAM will be configured with 0, 8, or 16 Mbytes of memory.

Pen Interfaces

The FPGA 62 contains four pen driver interfaces. The FPGA 62 provides support to the microprocessor during pen configuration and calibration and drives the pens directly during printing operations. Additionally, the FPGA 62 has the ability to individually power switch 30 VDC input power for each pen driver through solid-state relays.

I/O Interfaces

The FPGA 62 interfaces to all encoder, sensor, and general purpose inputs, as well as the two general-purpose buffered outputs and the high-speed custom interface provided in the circuit assembly 22. Interfacing these signals through the FPGA 62 allows flexibility in signal processing and control techniques.

Encoder Input Interface

The Encoder Input Interface provides quadrature decoding of both A and B encoder inputs. This allows the FPGA to track the exact location of product on a belt by tracking both forward and backward transport movement.

Sensor Input Interfaces

The sensor input interfaces to the FPGA 62 provide a programmable level of debounce and system precision.

General Purpose Input Interfaces

The General Purpose Input Interfaces are input to the FPGA. The state of these inputs is provided to the microprocessor either through interrupt generation, or a status register. Some level of "automatic" processing of these inputs can also be provided directly in the FPGA. These inputs are provided to allow OEMs some flexibility in providing external inputs to the circuit assembly 22.

General Purpose Buffered Output Interfaces

The General Purpose Output Interfaces are controlled by the FPGA 62. These interfaces can be controlled by command from the microprocessor, or automatically through encoder or sensor decoding.

High Speed Custom Interface

The High Speed Custom Interface is provided to allow direct intercommunication between imagers or between a satellite unit and an imager. The exact implementation of this interface is TBD. In addition, the interface may be used to communicate directly with OEM equipments such as Raster Imager Processors (RIPs).

PAL Interface

One of the primary purposes of the PAL 60 is to configure the FPGA 62 during system initialization. After FPGA configuration is completed, four of the FPGA configuration signals are available as general-purpose I/O connections between the PAL 60 and the FPGA. All FPGA configuration signals are connected to the PAL 60. During FPGA programming, the PAL 60 decodes the microprocessor control signals and generates the required signals to the FPGA. After FPGA configuration is completed, four configuration signals are available as general-purpose I/O connections between the FPGA 62 and the PAL 60.

LED Interfaces

The FPGA 62 controls two of the bi-color LEDs 15 on the imager 10 and on the satellite unit 100.

PAL Functions

PAL 60 is used to properly program the FPGA 62 during system initialization. In addition, the PAL 60 drives two status LEDs 15 and can be programmed to perform additional signal processing of the cleaning station motor encoder or motor sensor inputs. The PAL 60 has four general-purpose I/O connections 90 to the microprocessor 20.

Microprocessor Interface

The PAL 60 has a minimal interface to the microprocessor. The PAL 60 decodes all the microprocessor bus control signals, but none of the microprocessor address lines. Three chip select signals and four general purpose I/O lines 90 are also connected between the microprocessor 20 and the PAL 60.

FPGA Configuration

The PAL 60 decodes the microprocessor control signals and generates the proper programming signals to the FPGA during system initialization. Four connections between the PAL 60 and the FPGA are available for general purpose I/O (GPIO) after FPGA programming is completed.

Motor Control

The PAL device 60 is connected to allow it to provide additional support to the microprocessor 20 for cleaning station operations.

Quadrature Decoding

By default one channel of the cleaning station motor encoders is connected directly to the microprocessor 20. The microprocessor 20 "homes" the cleaning station every time, so the pulse stream from this one encoder is sufficient for system operation. Both motor control encoder signals from each of the cleaning station motors are input to the PAL device 60. The PAL 60 can be used to perform quadrature decoding of the motor encoders and output the information as "up" and "down" counts to timers contained in the microprocessor. This technique allows the microprocessor to eliminate jitter errors and exactly track the cleaning station tray without having to "home" the system every time.

Sensor Interfaces

The two cleaning station optical sensor signals from the sensors 71 and 73 are input to the PAL 60. Optionally, the PAL 60 could be used to debounce, or process these signals and provide the results on one of the GPIO signals 90 connected to the microprocessor 20.

Microprocessor I/O Interfaces

Four GPIO signals are available between the PAL 60 and the microprocessor 20. These signals will be used to set the PAL 60 into FPGA programming mode and program the FPGA 62, but can also be used for other purposes. One option is to drive the PAL LEDs or the Reset Circuit from the microprocessor 20.

Reset Control

The PAL device 60 performs the system power up reset. The input from the reset integrated circuit is input to the PAL 60, which generates the resets to the microprocessor 20 and the FPGA 62.

LED Interfaces

The PAL 60 controls two of the bi-color LEDs 15 on the imager 10 and on the satellite unit 100.

Status LEDs

Six Bi-Color LEDs 15 provide system status information. LEDs 15a and 15b are driven by the ethernet PHY to provide ethernet status information. LEDs 15c and 15d are driven from the PAL 60 to provide FPGA and system status information. LEDs 15e and 15f are driven from the FPGA to provide sensor and encoder status information.

Ethernet Status LEDs

10 Base-T Interface LED

LED 15a provides 10Base-T Interface information as follows:

| | |
|---|---|
| Half Duplex: | Green ON |
| Half Duplex Activity: | Green Flash |
| Full Duplex: | Red ON |
| Full Duplex Activity: | Red Flash |
| No Link: | LEDs OFF |

100 Base-T Interface LED

LED 15b provides 100 Base-T Interface information as follows:

| | |
|---|---|
| Half Duplex: | Green ON |
| Half Duplex Activity: | Green Flash |
| Full Duplex: | Red ON |
| Full Duplex Activity: | Red Flash |
| No Link: | LEDs OFF |

FPGA Status LED

LED 15c provides FPGA Status information as follows:

| | |
|---|---|
| FPGA Unconfigured | LED OFF |
| FPGA Configuration Underway | Red ON |
| FPGA Operational | Green ON |

System Status LED

LED 15d provides System Status information as follows:

| | |
|---|---|
| System Idle | LED OFF |
| System Printing | Green ON |
| System Error | Red ON |

Sensor/Encoder Status LED

LED 15e provides Sensor and Encoder Status information as follows:

| | |
|---|---|
| Sensor and Encoder Inactive | LED OFF |
| Encoder Leading Edge Detected | Green ON |
| Sensor Leading Edge Detected | Red ON |

The Sensor Leading Edge has priority over the Encoder Leading Edge. It is anticipated the detections will be held for 100 milliseconds.

Pen/Motor Status LED

LED 15f provides Pen and Cleaning Station Motor Status information as follows:

| | |
|---|---|
| Pens Powered Down | LED OFF |
| Pens Powered Up | Green ON |
| Cleaning Station Motor Voltage Missing | Red ON |

BDM (Background Debugger Mode) Connector

A 17-pin connector 98 is provided on the PCB Assembly for initializing the flash memory 86.

JTAG (Joint Task Action Group) Connector

A 6-pin connector 89 is provided on the circuit assembly 22 for initializing the PAL 60 and debugging the FPGA 62.

The circuit assembly 22 is a 10 Layer board with two thin core power/ground planes and six signal layers. The thin core material provides capacitance to the voltage planes allowing fewer decoupling capacitors in the design. The circuit assembly 22 uses 8 lead, interdigitated capacitors for decoupling. These capacitors have very small inductance to improve the performance of the capacitors. The circuit assembly decouples the power supply connector to the shield of the data connector, decouples the RS232, the output power, and output interfaces, and utilizes opto-isolated interfaces for all inputs interfaces to reduce the noise emissions.

Although the inventions described and claimed herein have been described in considerable detail with reference to certain exemplary embodiments, one skilled in the art will appreciate that the inventions described and claimed herein can be practiced by other embodiments. The embodiments shown herein have been presented for purposes of illustration and not limitation. Therefore, the spirit and scope of the appended claims should not be limited to the description of the particular embodiments contained herein.

While the invention has been described with reference to particular embodiments which has been shown in the figures and discussed above, it will be apparent to those skilled in the art that numerous variations, modifications and improvements may be made to the invention described herein without departing from the spirit and scope of the appended claims.

We claim:

1. An imaging device for constructing a variety of production configurations for depositing ink onto moving media comprising:
   a plurality of pen holding assemblies for holding a plurality of pens, including a first pen holding assembly and a second pen holding assembly;
   a processor for controlling the plurality of pens including one or more communication interfaces, a programmable logic device and a power input connector;
   said plurality of pen holding assemblies includes at least the first and second pen holding assemblies, and said processor is housed in a satellite unit whereby said first and second of pen holding assemblies are configurable in a variety of positions and orientations; and,
   the plurality of pen holding assemblies can be aligned in more than one position so as to provide the imager with a speed which is a multiple of a speed based on a single one of the pen holding assemblies, including a first position where the first and second pen holding assemblies are aligned in staggered relation to create a first print zone at a first location and a second print zone at a second location, and a second position where the first and second pen holding assemblies are aligned to create a single print zone.

2. An imaging device in accordance with claim 1 wherein:
   said plurality of pen holding assemblies is four single pen holding assemblies whereby said single pen holding assemblies are configurable in a variety of positions and orientations.

3. An imaging device in accordance with claim 1 wherein:
   at least one of said plurality of pen holding assemblies includes at least two pens that are aligned so as to provide said image with a speed which is a multiple of a speed based on a single one of said pens.

4. An imaging device in accordance with claim 1 wherein:
   the plurality of pen assemblies each have two or more pens which are offset so as provide a print zone which is wider than a print zone based on a single pen.

5. An imaging device in accordance with claim 1 wherein:
   the plurality of pen assemblies each have two or more pens which are different colors.

6. An imaging device in accordance with claim 1 wherein:
   the plurality of pen assemblies each have two or more pens which are aligned so as to provide the imager with a speed which is a multiple of a speed based on a single one of the pens.

7. An imaging device for constructing production configurations for depositing ink onto moving media comprising: a plurality of pen holding assemblies, the quantity of pen holding assemblies is two, each having one pen; a processor for controlling said pen holding assemblies including one or more communication interfaces, a programmable logic device and a power input connector; the processor is housed in a satellite unit; and, said pen holding assemblies being configurable in more than one position, the plurality of pen holding assemblies can be aligned in more than one position so as to provide the imager with a speed which is a multiple of a speed based on a single one of the pen holding assemblies, including a first position where the first and second pen holding assemblies are aligned in staggered relation to create a first print zone at a first location and a second print zone at a second location, and a second position where the first and second pen holding assemblies are aligned to create a single print zone.

8. An imaging device in accordance with claim 7 wherein:
   each of the plurality of pen holding assemblies includes a first housing for holding a group of three pens and a second housing for holding a fourth pen, whereby the second housing is connectable to said first housing, and said second housing is capable of being disposed on opposite sides of said first housing so as to accommodate bi-directional printing.

9. An imaging device in accordance with claim 8 wherein:
   the plurality of pen holding assemblies are aligned so as to provide the imager with a speed which is twice a speed based on a single one of the pen assemblies.

10. An imaging device for constructing a variety of production configurations for depositing ink onto moving media comprising: a plurality of pen holding assemblies;
    a processor for controlling said pen holding assemblies including one or more communication interfaces, a programmable logic device and a power input connector;
    said pen holding assemblies being configurable in more than one position; the quantity of the plurality of pen holding assemblies is two, each having two pens; and, the processor is housed in a satellite unit, the plurality of pen holding assemblies can be aligned in more than one position so as to provide the imager with a speed which is a multiple of a speed based on a single one of the pen holding assemblies, including a first position where the first and second pen holding assemblies are aligned in staggered relation to create a first print zone at a first location and a second print zone at a second location, and a second position where the first and second pen holding assemblies are aligned to create a single print zone.

11. An imaging device in accordance with claim 10 wherein:
the two pens in each of the two pen holding assemblies are aligned so as to provide said imager with a speed which is twice of a speed based on a single one of said pens.

12. An imaging device in accordance with claim 10 wherein:
the two pens in each of the two pen holding assemblies are aligned and the two pen holding assemblies are aligned so as to provide the imager with a speed which is four times a speed based on a single one of said pens.

13. An imaging device in accordance with claim 10 wherein:
the two pens in each of the two pen holding assemblies are offset so as provide a print zone which is twice as wide as a print zone based on a single pen.

14. An imaging device in accordance with claim 13 wherein:
the two pen holding assemblies are aligned so as to provide the imager with a speed which is two times a speed based on a single one of the pens and a print zone which is twice as wide as a print zone based on a single pen.

* * * * *